Patented May 22, 1951

2,554,242

UNITED STATES PATENT OFFICE 2,554,242

PROCESS FOR PREPARING PURE AUTOLYTIC TUBERCULIN

Harry J. Corper, Denver, Colo., assignor to The National Jewish Hospital, Denver, Colo., a corporation of Colorado No Drawing. Application January 26, 1946, Serial No. 643,744

2 Claims. (Cl. 167—79)

The invention relates to a pure autolytic transdermally effective tuberculin and its preparation by a new rapid economical process.

The present application is a continuation-in-part of my application, Serial No. 479,117, filed March 13, 1943, now abandoned.

Tuberculin is a generic term which is applied to those products which contain proteins or protein-like substances derived or obtained from the growth products of Mycobacterium tuberculosis and which have the property of eliciting a visible area of inflammation and reddening of the skin at the site of their subdermal or intradermal injection into tuberculous human subjects. In addition to this common property of all tuberculins, a few of them also have the property of producing the inflammation mentioned by mere application to the surface of the skin of tuberculous subjects. Such tuberculin may therefore be considered as transdermally active.

I have found that the physical and chemical treatments, previously employed, when applied to the nutrient medium for M. tuberculosis which contains the specific protein or proteins capable of causing the reddening of the skin mentioned, will nearly always bring about a denaturation and destruction of the sensitive transdermally active tuberculins which may be present. The physical and chemical treatments are necessary because the liquid medium containing the products of growth of M. tuberculosis not only contains the specific tuberculins causing the inflammatory skin reaction but also contains other products causing non-specific reactions and which therefore should be removed. Added to this, is the fact that it is necessary to concentrate the specific tuberculin in order to get a strength which has practical utility for skin testing of tuberculin sensitive subjects.

The old methods for obtaining tuberculin required months of growth of M. tuberculosis on a nutrient medium, because it is well known there is practically no production of tuberculin in liquid nutrient media for M. tuberculosis after only about one month's growth and it is also known that the peak of concentration of tuberculin in the liquid nutrient medium is only reached after a growth period of several months. Added to this, is the fact that the prior methods of isolating and purifying tuberculins have required relatively rigorous physical and chemical treatments which invariably destroyed all, or the greater part, of any transdermally effective tuberculins which might have been present. For this reason, the prior tuberculin preparations have been either entirely ineffective transdermally or have been so weak in their reaction producing ability when applied to the surface of the skin of tuberculous subjects that it has been necessary to use large quantities of these tuberculins for testing each individual subject.

It is an object of the present invention to provide a new and improved process for obtaining tuberculin products having high transdermal effectiveness when applied to the surface of the skin of tuberculous subjects.

A further object of the invention is to supply those skilled in the art of preparing tuberculins with a commercially valuable method which shortens by several hundred per cent the time required to produce a given quantity of practically useful transdermally effective tuberculins.

Another object is to provide a method for making tuberculin which is simple and direct and which eliminates undesirable products from the nutrient medium in which M. tuberculosis has grown, while using mild treatments for isolating the product such that little or no denaturation or alteration of transdermally effective tuberculin proteins results.

The above objects of the invention, and other desirable objects, are realized by following the procedure as described and illustrated below.

I have found that high yields of transdermally effective tuberculin proteins are produced in the relatively short period of about one month by growing Mycobacterium tuberculosis on synthetic non-protein medium for that period of time, separating the bacillary mass from the liquid medium without heating or sterilizing, or giving the product a like treatment which might denature proteins, and then adding a mixture of buffered water and an organic substance inert to the proteins and bacillary enzymes present but capable of arresting growth or actually killing the tubercle bacilli, and then autolyzing the dead bacilli in the aqueous mixture and separating the clear aqueous solution containing the transdermally active tuberculin from the insoluble products of the autolysate. The aqueous solution of the transdermally active tuberculin so obtained is evaporated, at low temperature, to obtain a dry solid product which can then be portioned out into any desired dosage.

By virtue of the fact that my new process completely eliminates nutrient medium and its constituents from the bacillary mass and at the same time makes use of bacilli which have not grown longer than about one month, the final tuberculin product differs from those hitherto available by being free from medium and also the numerous products of metabolism which are known to accumulate when the bacilli grow longer than one month. The separation of the pure, young and vigorously growing bacilli at the end of about one month and their utilization in a mild autolytic treatment brings about entirely unexpected high yields of active tuberculin. The product is therefore a new stable, bacteriologically pure, undenatured, transdermally effective, specific tuberculin in powder form which can be used as such or can be dissolved readily in watery solvents or mixtures. As obtained in the dry form it is usually a light brown mass which can be pulverized to a light tan or yellow powder which is readily soluble in water and other protein and nucleoprotein solvents.

The autolytic tuberculin is adaptable to use in watery or saline solutions, as is usual for injection tests with tuberculin, or it can be used in dry powder form, for transdermal or other contact tests. It has a far greater latitude of use than any other tuberculin previously prepared or described and possesses advantages both as to purity and economic phases of preparation.

In carrying out my process, I utilize a culture mixture of M. tuberculosis growing on one of the known synthetic non-protein media for M. tuberculosis, such as a Wong-Weinzirl medium, American Review of Tuberculosis, volume 33, page 577 (1936), for a period of about one month. In general, the growth period does not need to exceed about five or six weeks. The culture mixture is then treated, for example, by centrifugation or filtration, to separate nutrient medium from the bacillary mass and the latter washed well with sterile distilled water. The washed bacillary mass so obtained consists primarily of viable tubercle bacilli freed from medium constituents and metabolism products.

The washed bacillary mass is now ready for the autolytic treatment. The material used for this purpose is buffered water containing a very small amount, not more than a few per cent, of an inert organic fat solvent such as benzene, toluene, petroleum ether, xylene, trichloro-ethylene, bromobenzene, carbon disulfide, amyl alcohol, benzyl alcohol, ethyl ether, carbon tetrachloride and like solvents which arrest the growth of or which kill the bacilli but do not prevent their autolysis at incubator temperatures (around 37° C.). The bacillary mass is mixed with the water containing the organic solvent and the mixture brought to a pH of about 7 and maintained at pH 7 by adding a mild form of buffer alkali, such as sodium carbonate, and then incubated at about 37° C. for about one week in order to bring about autolysis. The autolyzed mixture is then filtered and the clear cell free filtrate concentrated at low temperature and finally dried, e. g., in vacuo.

The following example will serve to illustrate the invention.

(1) Tubercle bacilli grown for one month on a non-protein synthetic medium (the synthetic non-protein ammonium malate media of Wong-Weinzirl or any other non-protein nutrient medium) are washed thoroughly with sterile distilled water until the washings are free of chlorides when tested with silver nitrate. By this means, all extraneous materials such as media constituents as well as products resulting from the metabolism of the bacilli are practically removed.

(2) The washed bacilli are then transferred to sterile bottles containing 100 ml. of distilled water and a small amount of sodium carbonate (50 milligrams), about 10 grams of bacilli being transferred to each bottle.

(3) To the mixture of bacilli and solution in each bottle, there is added 1 ml. of C. P. toluene and the whole incubated (37° C.) for one week.

(4) The mixture is then filtered through an ultra filter membrane (a 1½% gun cotton acetic acid membrane) to remove intact bacilli and insoluble matter.

(5) The brilliant clear straw colored liquid is then concentrated by low temperature vacuum distillation, and (6) Finally dried completely over phosphoric anhydride in a vacuum desiccator. Other methods of drying may be used commercially.

The yield is a brown dry mass which powders readily with the formation of a light tan or yellow dry powder. The powder is definitely hygroscopic. The yield of this powder is about 10 mgs. per cc. of filtrate starting originally with about 2.4 grams of dried washed bacilli, showing the following analysis:

| | Per cent |
|---|---|
| Nitrogen | 4.54 |
| Ash | 16.45 |
| and | |
| Active tuberculin | About 10 |

Tuberculin precipitated from a solution of this powder with trichloracetic acid had a nitrogen content of 15.5%. The activity of the preparation was determined by injection into tuberculous guinea pigs and compared with standard tuberculin. This material is active in causing tuberculo-anaphylaxis and lethal tuberculo-allergy in properly prepared guinea pigs as well as eliciting local tuberculin reactions in man and animals, either by subdermal or intradermal injection and especially transdermally, as when applied directly to the surface of the skin.

What I claim as my invention is:

1. The process for obtaining a transdermally effective tuberculin which comprises growing tubercle bacilli on a non-protein medium to produce an abundance of viable tubercle bacilli without any substantial amount of metabolic constituents, separating the bacillary mass from said medium and from water-soluble constituents, mixing said separated bacillary mass with water and introducing a small amount of a bactericidal inert organic fat solvent capable of killing said viable bacilli without destroying the intracellular enzymes contained therein, incubating said aqueous mixture at a temperature about 37° C. and at a pH of about 7 to permit the intracellular enzymes in said bacterial mass to bring about autolysis of the dead bacilli and separating the liquid from the solid material in said autolyzed mixture and evaporating said liquid to produce a transdermally effective tuberculin product.

2. The process according to claim 1 in which said bactericidal organic solvent is toluene.

HARRY J. CORPER.

REFERENCES CITED

The following references are of record in the file of this patent:

UNITED STATES PATENTS

| Number | Name | Date |
|---|---|---|
| 785,734 | Hess | Mar. 28, 1905 |
| 2,032,544 | McEllroy | Mar. 3, 1936 |
| 2,171,320 | Lautenschlager | Aug. 29, 1939 |

FOREIGN PATENTS

| Number | Country | Date |
|---|---|---|
| 14,972 | Great Britain | of 1914 |
| 103,298 | Great Britain | Jan. 7, 1918 |
| 349,807 | Great Britain | Mar. 9, 1922 |
| 452,889 | Great Britain | Sept. 1, 1936 |

(Other references on following page)

OTHER REFERENCES

Wong: "Studies on purified tuberculin prepared from bacterial antibodies," in Proc. Soc. Exptl. Biol. and Med. (1940), vol. 45, pp. 845-848. (Copy in 167—79, Div. 43.)

Seibert in Am. Rev. of Tuberculosis, vol. 30 (1934), pp. 713-720. (Copy in 167—79, Div. 43.)

Mitchell: "A Textbook of Biochemistry," N. Y. (1946), pp. 223, 466. (Copy in Div. 43.)

Corper and Cohn: "Autolysis of Tubercle Bacilli . . ." in Am. Rev. of Tuberculosis, vol. 48 (1943), pp. 443-452. (Copy in Libr. Nat'l Inst. Health, Bethesda, Md.)

Gershenfeld: "Biological Products," N. Y. (1939), pp. 197-199. (Copy in Div. 43.)

Tiselius in Chemical Abstracts, vol. 38, July 1944, pp. 3350. (Copy in Pat. Off. Lib.)

Krueger: "The Bacteriophage," in Journ. Am. Med. Assn., May 10, 1941, vol. 116, pp. 2160-2167. (Copy in Pat. Off. Lib.)

"Tuberculosis—Bact. Path. and Lab. Diag.," by Baldwin, Petroff and Gardner (1927), pp. 308-312. (Photostat copy in Div. 43, 167—79.)